United States Patent
Charles et al.

(10) Patent No.: US 12,277,320 B1
(45) Date of Patent: Apr. 15, 2025

(54) IMPROVING DATA CENTER SUSTAINABILITY THROUGH DYNAMIC INCLUSION AND ELIMINATION OF PATHS

(71) Applicant: Dell Products L.P., Round Rock, TX (US)

(72) Inventors: Peniel Charles, Bangalore (IN); Pramod Kumar Puthanveettil Kurungodan, Bengaluru (IN); Owen Crowley, Carrigaline (IE); Dambarudhar Jani, Koraput (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/421,349

(22) Filed: Jan. 24, 2024

(51) Int. Cl.
*G06F 3/06* (2006.01)

(52) U.S. Cl.
CPC ............ *G06F 3/061* (2013.01); *G06F 3/0655* (2013.01); *G06F 3/067* (2013.01)

(58) Field of Classification Search
None
See application file for complete search history.

(56) References Cited

U.S. PATENT DOCUMENTS 9,705,798 B1 * 7/2017 Abts ................... H04L 47/122

\* cited by examiner

*Primary Examiner* — Brian R Peugh
(74) *Attorney, Agent, or Firm* — Daly, Crowley, Mofford & Durkee, LLP

(57) ABSTRACT

A method, comprising: selecting an HBA entity that is currently turned on and which is part of a host device, the host device being coupled to a storage array, the host device being configured to read and write data to the storage array; identifying an identifier of the HBA entity; identifying, based on the identifier, a switch that is coupled to the HBA entity via a communications path; identifying one or more other communications paths that span between the host device and the switch; detecting whether a redundancy policy would be violated if the HBA entity were to be turned off, the redundancy policy including at least one rule that specifies a minimum number of active paths that must be present between the host device and the switch at any given time; turning off the HBA entity in response to detecting that the redundancy policy would not be violated.

20 Claims, 5 Drawing Sheets

IMPROVING DATA CENTER SUSTAINABILITY THROUGH DYNAMIC INCLUSION AND ELIMINATION OF PATHS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: selecting a host bus adapter (HBA) entity that is currently turned on and which is part of a host device, the host device being coupled to a storage array, the host device being configured to read and write data to the storage array; identifying an identifier of the HBA entity; identifying, based on the identifier, a switch that is coupled to the HBA entity via a communications path; identifying one or more other communications paths that span between the host device and the switch; detecting whether a redundancy policy would be violated if the HBA entity were to be turned off, the redundancy policy including at least one rule that specifies a minimum number of active paths that must be present between the host device and the switch at any given time; turning off the HBA entity in response to detecting that the redundancy policy would not be violated; and leaving the HBA entity turned on in response to detecting that the redundance policy would be violated.

According to aspects of the disclosure, a system is provided, comprising: a memory; and at least one processor that is configured to perform the operations of: selecting a host bus adapter (HBA) entity that is currently turned on and which is part of a host device, the host device being coupled to a storage array, the host device being configured to read and write data to the storage array; identifying an identifier of the HBA entity; identifying, based on the identifier, a switch that is coupled to the HBA entity via a communications path; identifying one or more other communications paths that span between the host device and the switch; detecting whether a redundancy policy would be violated if the HBA entity were to be turned off, the redundancy policy including at least one rule that specifies a minimum number of active paths that must be present between the host device and the switch at any given time; turning off the HBA entity in response to detecting that the redundancy policy would not be violated; and leaving the HBA entity turned on in response to detecting that the redundancy policy would be violated.

According to aspects of the disclosure, a non-transitory computer-readable medium storing one or more processor-executable instructions, which, when executed by at least one processor, cause the at least one processor to perform the operations of: selecting a host bus adapter (HBA) entity that is currently turned on and which is part of a host device, the host device being coupled to a storage array, the host device being configured to read and write data to the storage array; identifying an identifier of the HBA entity; identifying, based on the identifier, a switch that is coupled to the HBA entity via a communications path; identifying one or more other communications paths that span between the host device and the switch; detecting whether a redundancy policy would be violated if the HBA entity were to be turned off, the redundancy policy including at least one rule that specifies a minimum number of active paths that must be present between the host device and the switch at any given time; turning off the HBA entity in response to detecting that the redundancy policy would not be violated; and leaving the HBA entity turned on in response to detecting that the redundance policy would be violated.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4 is a flowchart of an example of a process, according to aspects of the disclosure;

DETAILED DESCRIPTION

Sustainability lies at the core of storage array operations, encompassing environmentally responsible practices that minimize the ecological footprint of storage arrays. To increase the sustainability of storage arrays, it is necessary to eliminate underutilized components or enable them only when needed. Making these improvements could streamline energy utilization and reduce carbon footprint, proactively adding to a greener future.

According to the present disclosure, a method is provided for reducing the power consumption of storage arrays. The method uses host multipathing (MPIO) software to identify the number of physical paths from a host to a storage array and use the storage array's workload analytics to determine peak load times. These details are consumed by the MPIO software resulting in a portion of the redundant physical paths between host and storage array being turned off during off-peak load periods for the purpose of energy saving without compromising configured fault tolerance.

Host devices with storage array connectivity is usually configured with multiple Fibre Channel (FC) paths to the storage array. The number of paths can commonly range from 4 to 32 with best practices recommending 1×1 mappings—i.e., one host bust adapter (HBA) port connects to one storage array Front-end port for active-active storage arrays.

Every customer host device is unique, having its own specific peak load times. It is during these times that it becomes critical to maximize the number of FC paths to ensure the highest bandwidth requirements are met. However, host devices will not always operate at peak load, and having multiple HBAs and storage array ports active at all times when there is no peak load is not beneficial nor sustainable from a power consumption and heat dissipation perspective, especially in scaled-up environments where there can be a large number of HBAs and switch ports underutilized.

Green and sustainable storage arrays are very much in focus within the IT industry, with recent studies predicting increased data center energy demand in the coming years. It is because of such research that the European Commission published a Code of Conduct for Energy Efficiency in Data Centers with the aim of improving energy efficiency. Considering the forecasted storage array energy usage, reducing energy costs through greener and more sustainable data centers becomes necessary, and dynamically configuring fabric connections to reduce energy consumption provides an ideal opportunity to integrate with the existing energy-saving features that exist in SAN components such as Gen 6 Fibre Channel switches where energy savings can be achieved.

Figure 1:
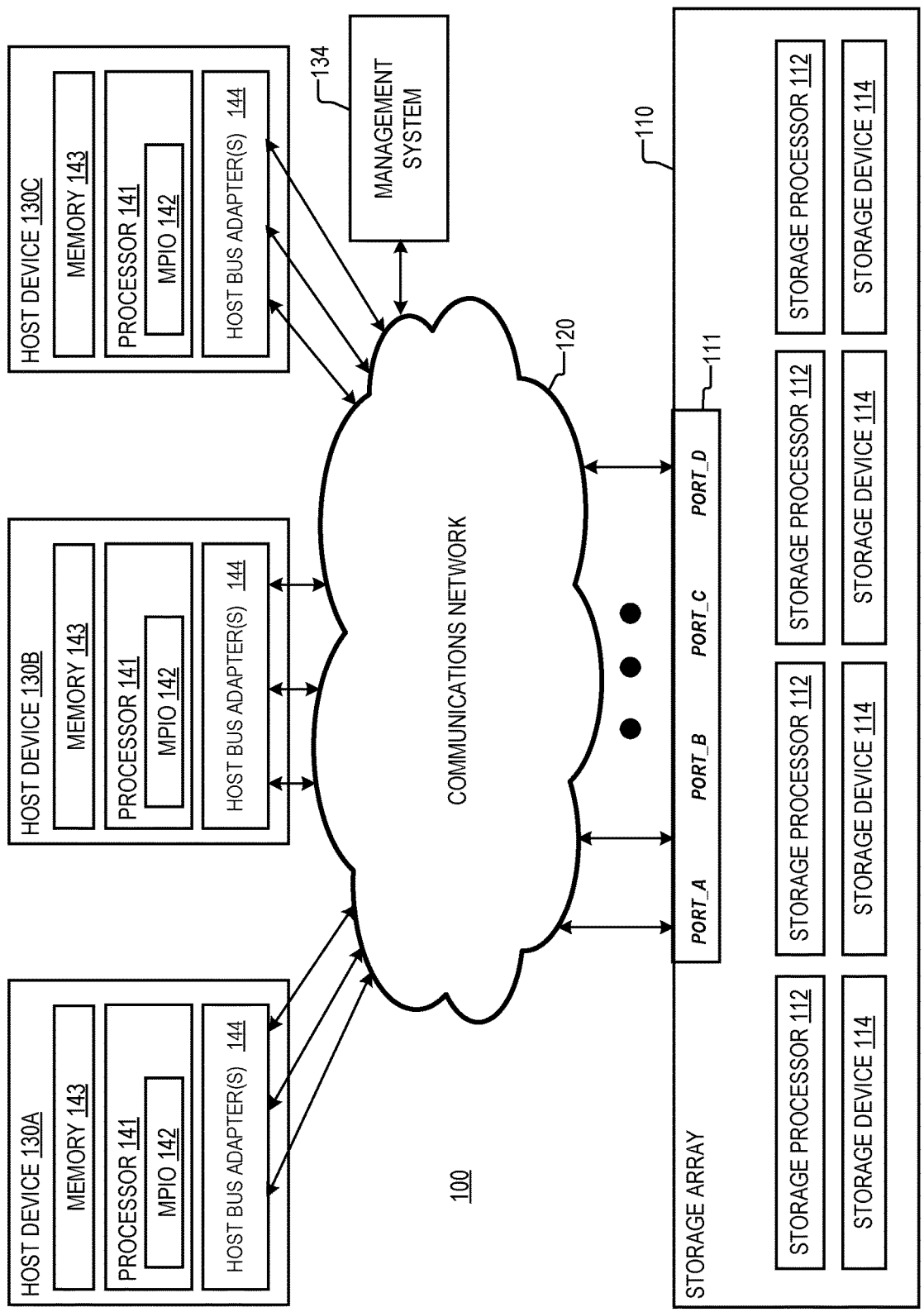
FIG. 1 is a diagram of an example of a system, according to aspects of the disclosure.

FIG. 1 is a diagram of an example of a system 100, according to aspects of the disclosure. As illustrated, the system 100 may include a storage array 110, a communications network 120, a plurality of host devices 130A-C, and a management system 134.

Figure 6:
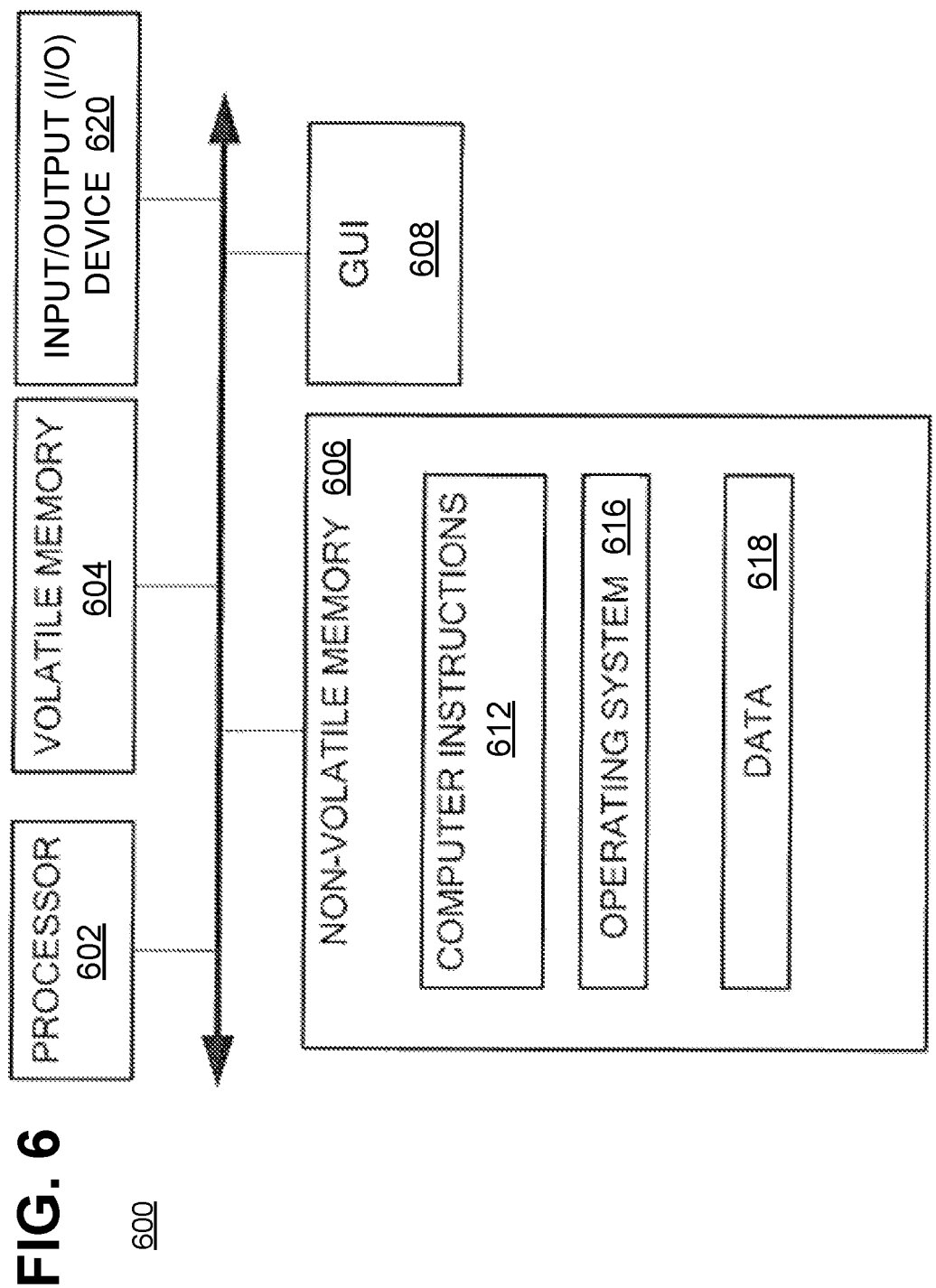
FIG. 6 is a diagram of an example of a computing device, according to aspects of the disclosure.

The storage array 110 may include a frontend 111, a plurality of storage processors 112, and a plurality of storage devices 114. Frontend 111 may provide a plurality of ports for connecting the storage array 110 (and/or storage processors 112) to the communications network 120. Each of the storage processors 112 may include a computing device that is configured to receive I/O requests from any of the host devices 130A-C and execute the received I/O requests by reading or writing data to the storage devices 114. In some implementations, each of the storage processors 112 may have an architecture that is the same or similar to the architecture of the computing device 600, which is shown in FIG. 6. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, the storage devices 114 may be arranged in one or more Redundant Array(s) of Independent Disks (RAID) arrays. The communications network 120 may include one or more of the Internet, a local area network (LAN), a wide area network (WAN), a fibre channel (FC) network, and/or any other suitable type of network. According to the present example, communications network 120 includes an FC network. The FC network may include a plurality of switches, such as switches 304 and 306, which are discussed further below with respect to FIGS. 3 and 4.

Each of the host devices 130A-C may include a laptop, a desktop computer, a smartphone, a tablet, an Internet-of-Things device, and/or any other suitable type of electronic device that is configured to retrieve and store data in the storage array 110. Each host device 130 may include a memory 143, a processor 141, and one or more host bus adapters (HBAs) 144. The memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. The processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130A-C to the storage array 110. In other words, each of the HBAs 144 may include a communications interface for connecting to the communications network 120, storage array 110, and/or management system 134. Although in the example of FIG. 1 each of the host devices 130A-C is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142 (hereinafter "multipath driver 142"). The MPIO driver 142 may comprise, for example, PowerPath™ drivers from Dell EMC™, and/or other types of multipath drivers. The multipath driver 142 of any of the host devices 130A-C may be configured to select I/O request from any of the I/O queues of the multipath driver's host device and transmit the I/O requests to storage array 110. Furthermore, as is discussed further below, the multipath driver 142 may be configured to selectively turn off HBA ports or entire HBAs to reduce the power consumption of the host device it is part of. Additionally or alternatively, in some implementations, the multipath driver 142 may be configured to perform a process 500, which is discussed further below with respect to FIG. 5.

The HBA 144 of each of the host devices 130A-C may include one or more ports (hereinafter "HBA ports"). According to the present example, and for ease of description, each HBA 144 includes only one HBA port. However, in most practical applications, each HBA 144 would include more than one HBA port. In this regard, it will be understood that the present disclosure is not limited to any specific implementation of the HBAs 144. According to the present example, the ports in the frontend 111 of storage array 110 are enumerated as port A, port B, port C, and port D. Although storage array 110 is depicted as including only four ports, it will be understood that storage array 110 may include a different number of ports. Furthermore, in many practical applications, storage array 110 may include a much larger number of ports (e.g., 100). According to the present example, each of host devices 130A-C is provided with four HBA ports, which are enumerated port 1, port 2, port 3, and port 4 (e.g., see FIGS. 3-4). However, it will be understood that alternative implementations are possible in which each of host devices 130A-C includes a different number of HBA ports.

The management system 134 may include a computing device, such as the computing device 600, which is discussed further below with respect to FIG. 6. The management system 134 may be configured to execute a management appliance that is arranged to orchestrate the operation of the multipath drivers 142 in the host devices 130A-C. For example, the management appliance may be configured to collect usage analytics for storage array 110 and identify periods when storage array 110 is subjected to low utilization and other periods when the storage array 110 is subjected to high utilization. For example, the management appliance may find out that storage array 110 is normally subjected to low utilization between 1 a.m. and 9 a.m. on Monday, Tuesday, Wednesday, Thursday, and Friday of every week. Similarly, the management appliance may find out that storage array 110 is normally subjected to high utilization between 3 p.m. and 6 p.m. on Monday, Tuesday, Wednesday, Thursday, and Friday of every week. The management appliance may proactively cause the multipath drivers 142 to turn on additional HBAs or (HBA ports) at the beginning of periods in which the storage array 110 has historically exhibited high utilization. Similarly, the management appliance may proactively cause the multipath drivers 142 to turn off some of their HBAs or HBA ports at the beginning of periods in which the storage array 110 has historically exhibited low utilization.

Additionally or alternatively, in some implementations, the management appliance may be configured to reactively cause the multipath drivers 142 to turn on or off additional HBAs or HBA ports. For example, the management appliance may be configured to cause one or more multipath drivers 142 to turn off HBAs or HBA ports when the management appliance detects that the storage array 110 is experiencing a low load. Similarly, the management appliance may be configured to cause one or more multipath drivers 142 to turn on HBAs or HBA ports when the management appliance detects that the storage array 110 is experiencing an increased load.

Additionally or alternatively, in some implementations, each of the multipath drivers 142 may be configured to operate autonomously of the management appliance and/or management system 134. In such implementations, a multipath driver may monitor the number (or count) of input-output (I/O) requests that are transmitted from the host device executing the multipath driver 142 to the storage array 110. When the number is below a first threshold, the multipath driver 142 may turn off one or more HBAs or HBA ports in the host device that is executing the multipath driver 142. When the number is below a second threshold, the multipath driver 142 may turn on one or more HBAs or HBA ports in the host device that is executing the multipath driver 142. The second threshold may be greater than or equal to the first threshold.

Figure 2:
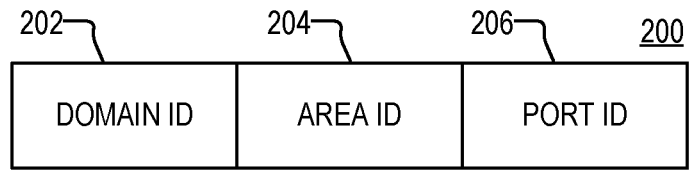
FIG. 2 is a diagram showing the structure of a fibre channel identifier (FCID)

FIG. 2 is a diagram of an example of an FCID, according to the prior art. Shown in FIG. 2 is an FCID 200 having a domain ID portion 202, an area ID portion 204, and a port ID portion 206. FCID 200 is an identifier that is assigned to an individual HBA port in any of host devices 130A-C. The domain ID portion 202 in FCID 200 identifies a switch in communications network 120 that is connected (e.g., coupled or directly connected) to the HBA port to which FCID 200 is assigned. The domain ID (contained in portion 202) is unique for all HBA ports connected to the same switch in communications network 120. If two HBA ports are connected to the same switch, the domain ID portions of their respective FCIDs would be the same. If the domain ID portions of the FCIDs of the HBA ports are different, this means that the HBA ports are connected to different switches. The port ID contained in portion 206 is an identifier belonging to the HBA port to which the FCID 200 is assigned. The area ID contained in portion 204 is not used in the present example, but in some applications, it can be used to identify a specific portion of the domain identified by the domain ID.

Figure 3:
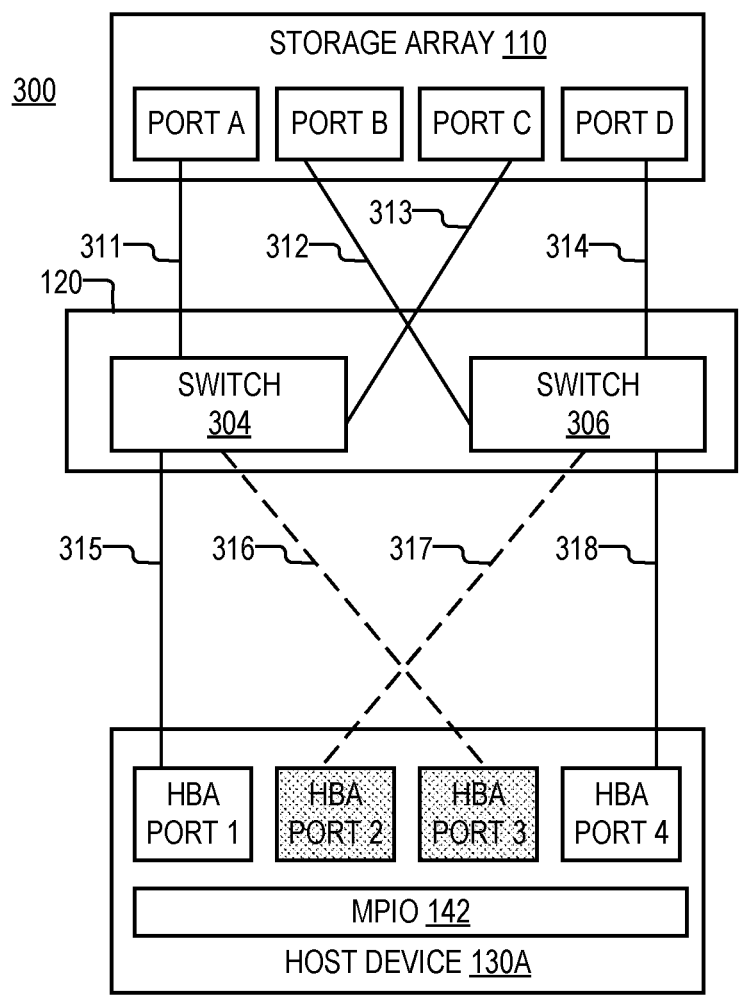
FIG. 3 is a diagram illustrating aspects of the operation of the system of FIG. 1, according to aspects of the disclosure.

FIG. 3 is a diagram of a portion 300 of system 100, according to aspects of the disclosure. Shown in FIG. 3 are switches 304 and 306, which are part of communications network 120. As illustrated, switch 304 is coupled to ports A and C of storage array 110 via communications paths 311 and 313, respectively. Switch 306 is coupled to ports B and D of storage array 110 via communications paths 312 and 314. Furthermore, switch 304 is coupled to HBA ports 1 and 3 of a host device 130A via communications paths 315 and 316, respectively. And switch 306 is coupled to HBA ports 2 and 4 of the host device 130A, via communications paths 317 and 318. According to the example of FIG. 3, the multipath driver 142 of the host device 130A determines that the group consisting of communications paths 315, 316, 317, and 317 is underutilized. By analyzing the FCID of each of HBA ports 1-4, the multipath driver 142 determines that communications paths 316 and 317 are suitable candidates for turning off (in order to reduce the power consumption of the host device 130A). Next, the multipath driver 142 turns off HBA ports 2 and 3. In some implementations, the number of communications paths between host device 130A and switches 304 and 306, the greater the opportunity to turn off some of those communications paths during off-peak load periods. In some implementations, preferences may be set, which establish goals for maximum power savings of non-critical/test systems versus lesser path reductions on production environments. According to the present example, each of HBA ports 2-3 is part of a different HBA adapter 144. However, alternative implementations are possible in which at least two of HBA ports 1-4 are part of the same HBA adapter. According to the present example, communications paths 316 and 317 are turned off by turning off the HBAs 144 of which HBA ports 2 and 3 are part. However, alternative implementations are possible in ports 2 and 3 are turned off individually, while other HBA ports that are collocated on the same HBA(s) with ports A and C are allowed to remain turned on.

Figure 4:
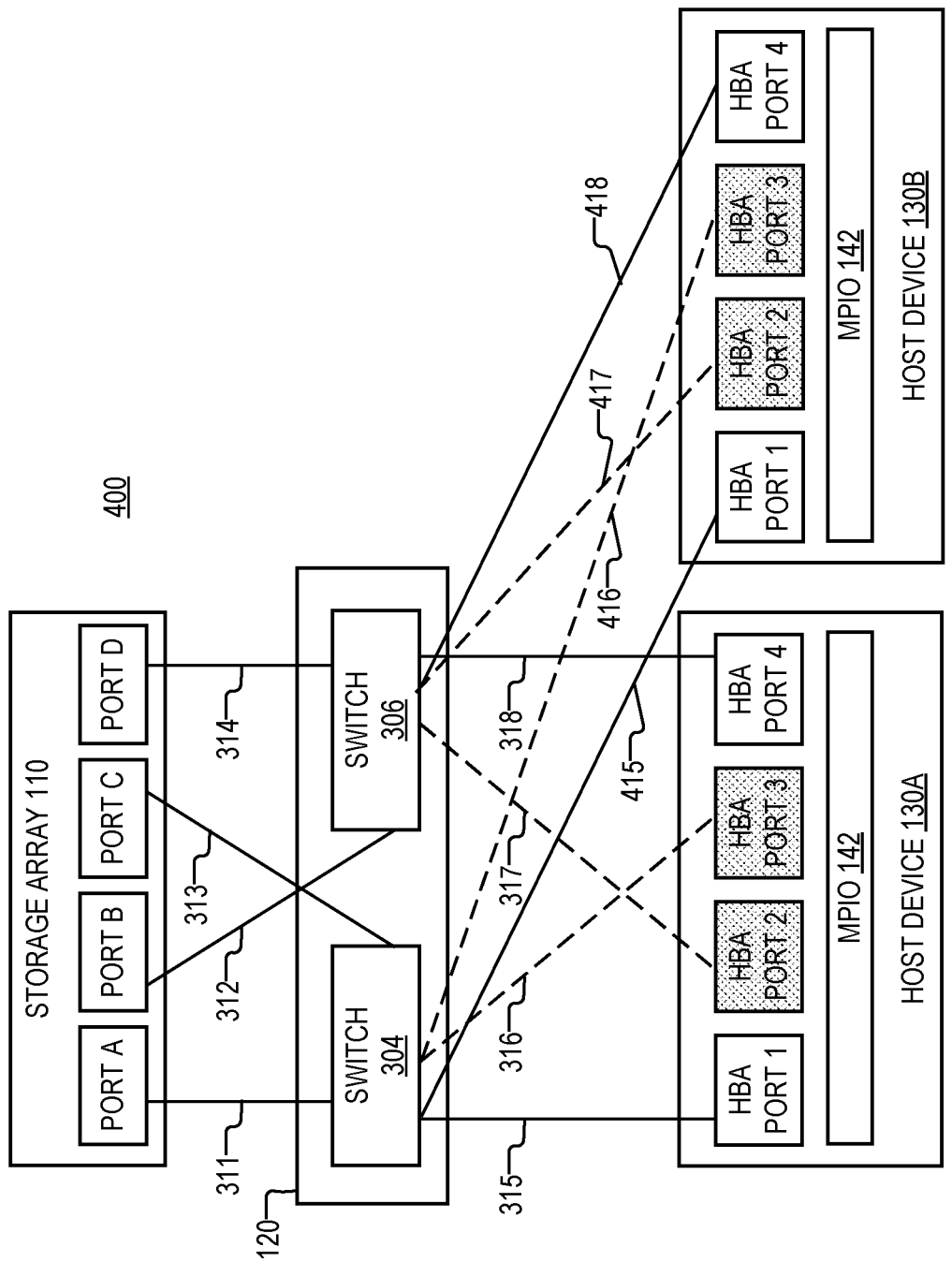
FIG. 4 is a diagram illustrating aspects of the operation of the system of FIG. 1, according to aspects of the disclosure.

FIG. 4 is a diagram of a portion 400 of system 100, according to aspects of the disclosure. Shown in FIG. 4 are switches 304 and 306, which are part of communications network 120. As illustrated, switch 304 is coupled to ports A and C of storage array 110 via communications paths 311 and 313, respectively. Switch 306 is coupled to ports B and D of storage array 110 via communications paths 312 and 314. Switch 304 is coupled to HBA ports 1 and 3 of a host device 130A via communications paths 315 and 316, respectively. Switch 304 is further coupled to HBA ports 1 and 3 of a host device 130B via communications paths 415 and 416, respectively. Switch 306 is coupled to HBA ports 2 and 4 of the host device 130A, via communications paths 317 and 318. Switch 306 is further coupled to HBA ports 2 and 4 of the host device 130B, via communications paths 417 and 418. According to the example of FIG. 3, the multipath driver 142 of the host device 130A determines that the group consisting of communications paths 315, 316, 317, and 317 is underutilized. Furthermore, the multipath driver 142 of the host device 130B determines that the group consisting of communications paths 415, 416, 417, and 417 is also underutilized. According to the present example, communications paths 316 and 416 terminate at the same port of switch 304, and they are the only paths terminating at this port. Accordingly, after communications paths 316 and 416 are turned off, switch 304 may detect that there are no active communications paths (or HBA ports) connected to the switch port, and may turn off the switch port, thereby causing further power savings to be realized. Moreover, according to the example of FIG. 4, communications paths 317 and 417 terminate at the same port of switch 306, and they are the only paths terminating at this port. Accordingly, after communications paths 317 and 417 are turned off, switch 304 may detect that there are no active communications paths (or HBA ports) connected to the switch port, and may turn off the switch port, thereby causing further power savings to be realized. The additional power savings may be realized because Generation 6 FC switches implement a feature whereby, they turn off ports that are not connected to any active ports on the far end.

In the example of FIGS. 3-4, each of the communications paths is depicted as a direct link between a switch and a port (i.e., depicted as single-hop communications paths). However, it will be understood that additional switches and/or other hardware may be present on each of the communications paths. In such implementations, any of the communications paths may include multiple hops. According to the present example, detecting that a communications path is underutilized may include detecting that an HBA port (in one of HBAs 144) is underutilized. The HBA port may be situated at one of the ends of the communications path. Similarly, turning off the communications path may include turning off the HBA port.

Figure 5:
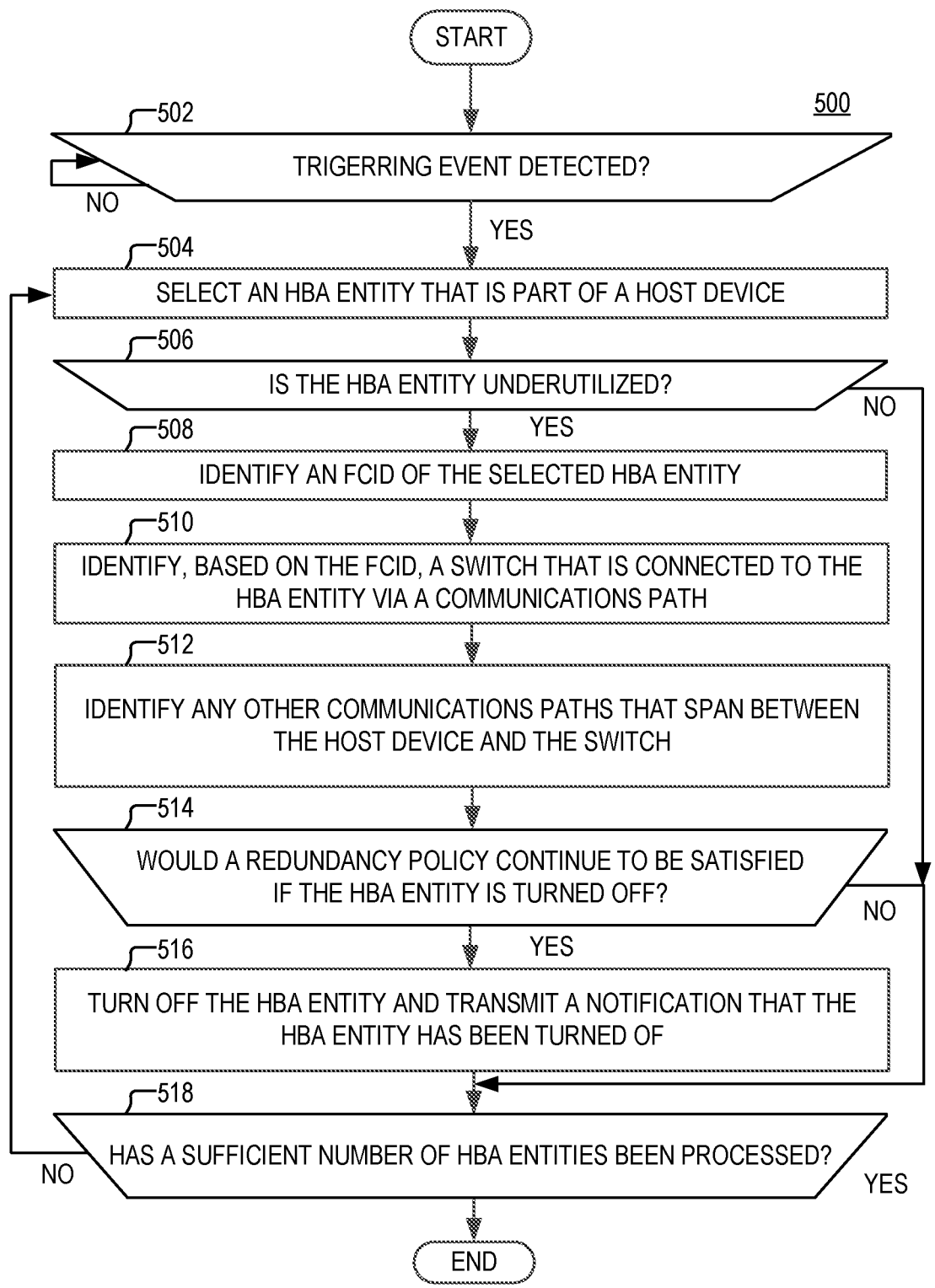
FIG. 5 is a flowchart of an example of a process, according to aspects of the disclosure.

FIG. 5 is a flowchart of an example of a process 500, according to aspects of the disclosure. According to the present example, process 500 is performed by the multipath driver 142 of host device 130A. However, the present disclosure is not limited to any specific entity or set of entities executing the process 500. FIG. 5 is provided as an example only. At least some of the steps in process 500 may be performed in a different order, in parallel, or altogether omitted.

At step 502, the multipath driver 142 of host device 130A detects whether a triggering event is generated. In some implementations, the triggering event may be an event that is generated, by management system 134, at the beginning of (or shortly before) a period in which storage array 110 is expected to experience a low load, as suggested by a historical record of the operation of storage array 110. The period may be identified by the management system 134 as a result of management system 134 collecting various usage analytics for storage array 110 and recognizing a pattern that is characterized by the storage array 110 experiencing a low load during the period. In some implementations, storage array 110 may be considered to be subjected to a low load when the number of I/Os per second (IOPS) that are executed by storage array 110 is below a predetermined threshold.

In some implementations, management system 134 may monitor the individual usage of storage array 110 by each of host devices 130A-C. In such implementations, the management system 134 may maintain a separate list of low utilization period(s) for each of host devices 130A-C. The lists may indicate that host device 130A is placing a low load on storage array 110 during a given period (e.g., 9 a.m. to 1 p.m. on Monday, Tuesday, Wednesday, Thursday, and Friday), while, during the same period, host device 130B is placing a normal or high load on storage array 110. In such implementations, the triggering event (detected at step 502) may be generated by management system 134 in response to management system 134 detecting that the given period is about to begin. The triggering event may be transmitted to host device 130A, but not to host device 130B. Management system 134 may detect that the given period is about to begin based on the list of low utilization period(s) that is specific to the host device 130A. The term "list of low utilization periods" refers to a data structure or memory location that identifies one or more periods in which a respective host device is placing a low load on storage array 110. As noted above, management system 134 may maintain a different list of low utilization periods for each of host devices 130A-C. A host device may be considered to be placing a low load on storage array 110 when the number of I/O requests transmitted by the host device to storage array 110 is below a predetermined threshold.

Additionally, or alternatively, in some implementations, the triggering event may include an event that is generated by management system 134 in response to management system 134 detecting that storage array 110 is currently experiencing a low load. Additionally or alternatively, in some implementations, the triggering event may be an event that is generated by host device 130A. The triggering event may be generated when the host device 130A detects that the storage array 110 is being underutilized by the host device 130A. According to the present example, the storage array 110 is considered underutilized by the host device 130A when the count of I/O requests that are transmitted from the host device 130A to storage array 110 is below a predetermined threshold. If a triggering event is detected at step 502, process 500 proceeds to step 504. Otherwise, step 502 is performed again. In some implementations, the usage analytics may include IOPS served by the storage system at different times and/or any other suitable type of usage analytics.

At step 504, the multipath driver 142 of host device 130A selects an HBA entity that is part of the host device 130A. According to the present example, the HBA entity is an HBA port in one of the HBAs 144 of host device 130A. However, alternative implementations are possible in which the selected HBA entity is one of the HBAs 144.

In some implementations, selecting the HBA entity may include selecting the FCID of the HBA entity. The selection is made from a list that includes the FCID of each HBA port that is part of host device 130A. The selection is made by using a round-robin algorithm. In instances in which the selected HBA entity is an HBA, the selection may be made from a list that identifies each HBA that is part of the host device 130A. The round-robin algorithm for selection of the HBA entity may persist across multiple/different executions of process 500 to ensure a uniform wear of all HBAs or HBA ports in host device 130A. That is, if, during a first execution, HBA entities 1, 2, and 3 are selected, in the next execution of process 500, entities 4, 5, and 6 may be selected, and so forth until the round-robin pointer is rolled back to its initial value. In other words, the current value of the round-robin pointer may be preserved after the execution of process 500 ends and subsequently used when the next execution of process 500 begins.

At step 506, the multipath driver 142 of host device 130A detects whether the selected entity is underutilized. In some implementations, the selected HBA entity may be underutilized when the number of I/O requests (or other messages) that are transmitted from the selected HBA entity to storage array 110 is below a first threshold. Additionally or alternatively, in some implementations, the selected HBA entity may be underutilized when the number of I/O request responses (or other messages) that are received at the selected HBA entity from storage array 110 is below a second threshold. If the selected HBA entity is underutilized, process 500 proceeds to step 508. Otherwise, process 500 proceeds to step 510.

At step 508, the multipath driver 142 of host device 130A identifies one or more FCIDs that are associated with the selected HBA entity. According to the present example, the selected HBA entity is an HBA port, and the multipath driver 142 of host device 130A identifies the FCID of the HBA port. However, when the selected HBA entity is an HBA, the multipath driver may identify a plurality of FCIDs, where each FCID in the plurality belongs to a different port in the HBA. In implementations in which step 508 is redundant with step 504 (or another step), step 508 may be omitted.

At step 510, the multipath driver 142 of host device 130A identifies one or more switches that are associated with the selected HBA entity. According to the present example, the selected HBA entity is an HBA port, and the multipath driver 142 of host device 130A identifies the switch that is coupled to the HBA port. The switch is identified based on the FCID of the HBA port. In instances in which the selected HBA entity is an HBA, the multipath driver may identify each respective switch to which one of the ports in the HBA is coupled.

At step 512, the multipath driver 142 of host device 130A identifies a plurality of other communications paths that span between host device 130A and the switch (identified at step 510). According to the present example, the plurality of other communications paths includes all communications paths that span between the host device 130A and the switch (identified at step 510). However, alternative implementations are possible in which the plurality of communications paths includes fewer than all communications paths. To perform step 512, the multipath driver 142 of host device 130A may identify a plurality of FCIDs, wherein each FCID in the plurality corresponds to a different HBA port in host device 130A, and the plurality of FCIDs includes the respective FCID of each of the HBA ports in host device 130A. Next, the multipath driver 142 of host device 130A may identify a subset of the plurality FCIDs that includes the domain ID that corresponds to the switch (identified at step 510). In other words, the multipath driver 142 of host device 130A may identify all FCIDs in the plurality that contain the domain ID that corresponds to the switch (identified at step 512). The count of FCIDs that contain the domain ID corresponding to the switch is equal to the number of communications paths that span between the host device 130A and the switch (identified at step 510). In instances in which multiple switches are identified at step 510 (i.e., when the HBA entity is an HBA rather than an HBA port), the same methodology could be used to identify the number of communications paths that span between each of the switches and the host device 130A.

At step 514, the multipath driver 142 of host device 130A determines if a redundancy policy would continue to be satisfied if the HBA entity is turned off. According to the present example, the redundancy policy is stored in the memory of host device 130A. However, the present disclosure is not limited thereto. According to the present example, the HBA entity is an HBA port, only one switch is identified at step 510, and the redundancy policy includes a number, a string, an alphanumerical string, or an expression that specifies the minimum number of communications paths which need to be active (e.g., turned on) at all times between the host device 130A and the switch (identified at step 510). For example, in some implementations, the redundancy policy may specify a percentage of all communications paths between the host device 130A and the switch (identified at step 510) which need to be active (e.g., turned on) at all times. According to the present example, the multipath driver 142 of host device 130A determines whether the total number of active paths would fall below the minimum specified by the redundancy policy if the HBA entity were to be turned off. The determination may be made by subtracting the number '1' from the count of communications paths that extend between host device 130A and the switch (identified at step 510). If the resulting difference is less than the minimum prescribed by the redundancy policy, the multipath driver 142 of host device 130A determines that the redundancy policy would not continue to be satisfied if the HBA entity is turned off (i.e., it would become violated), and the process 500 proceeds to step 518. If the resulting difference is greater than or equal to the minimum prescribed by the redundancy policy, the multipath driver may determine that the redundancy policy would continue to be satisfied, and process 500 proceeds to step 516.

As noted above, the present example assumes that the HBA entity is an HBA port, and only one switch is identified at step 510. In implementations in which the HBA entity includes an HBA and more than one switch is identified, the redundancy policy may include one or more numbers, one or more strings, one or more alphanumerical strings, or one or more expressions that specify the minimum number of communications paths which need to be active (or turned on) at all times between the host device 130A and any one of the switches. In this example, to complete step 514, the multipath driver 142 of host device 130A may determine how many paths would remain between the host device 130A and each of the switches if the HBA were to be turned off. When the number of remaining paths for any of the switches is below the minimum of that switch (i.e., the minimum prescribed by the redundancy policy), the multipath driver 142 of host device 130A may determine that the redundancy policy would be violated, and the process 500B may proceed to step 518. Otherwise, process 500 may proceed to step 516.

At step 516, the multipath driver turns off the HBA entity (selected at step 504). According to the present example, the HBA entity is an HBA port, and turning off the HBA entity includes powering down the port. However, alternative implementations are possible in which the turning of the entity includes powering down the HBA of which the port is part. Although, in the present example, turning off the entity includes powering down the entity, the present disclosure is not limited thereto. As used throughout the disclosure, the phrase "turning off an HBA entity" shall mean transitioning the HBA entity from a normal operating state of the HBA entity to a state in which the HBA entity consumes less power (than in the normal state). The latter state could be a state in which the HBA entity is powered down completely, a state in which the HBA entity is allowed to operate in a limp mode, a state in which the HBA entity is allowed to operate in standby mode or a state in which the clock speed is reduced of the circuitry that comprises the HBA entity. In other words, the phrase "turning off the HBA entity" may refer to any action that causes the HBA entity to exit its normal operating state and enter another state it is capable of assuming, and in which it consumes less power than when in the normal operating state. In some implementations, the multipath driver 142 of host device 130A may transmit a message to storage array 110 and/or management system 134 indicating that the HBA entity is being turned off.

At step 518, the multipath driver 142 of host device 130A determines if a sufficient number of HBA entities has been processed. If a sufficient number of HBA entities has been processed, the process 500 ends. Otherwise, process 500 returns to step 504 and another entity is selected which was not selected and processed during the current execution of process 500 (e.g., during an earlier iteration of step 504).

Process 500 is an example of a process for turning off different HBA entities in a host device (and/or their communications paths) in order to save power. However, any of the HBA entities that are turned off as a result of executing process 500 may be turned back on in response to another triggering event, which is different from the triggering event discussed above with respect to step 502. In some implementations, the other triggering event may be an event that is generated, by management system 134, at the beginning of (or shortly before) a period in which storage array 110 is expected to experience a normal (or heavy) load, as suggested by a historical record of the operation of storage array 110. The period may be identified by the management system 134 as a result of management system 134 collecting various usage analytics for storage array 110 and recognizing a pattern that is characterized by the storage array 110 experiencing a normal (or heavy) load during the period. In some implementations, storage array 110 may be considered subjected to a normal (or heavy) load when the number of I/Os per second (IOPS) that are executed by storage array 110 rises above a predetermined threshold. Additionally, or alternatively, in some implementations, the other triggering event may include an event that is generated by management system 134 in response to management system 134 detecting that storage array 110 is currently experiencing a normal or heavy load. Additionally or alternatively, in some implementations, the other triggering event may be an event that is generated by host device 130A. For example, the other triggering event may be generated when the host device 130A detects that the number of I/O requests or other messages that are exchanged between the host device 130A and storage array 110 has risen above a predetermined threshold.

Referring to FIG. 6, in some embodiments, a computing device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

FIGS. 1-6 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
    selecting a host bus adapter (HBA) entity that is currently turned on and which is part of a host device, the host device being coupled to a storage array, the host device being configured to read and write data to the storage array;
    identifying an identifier of the HBA entity;
    identifying, based on the identifier, a switch that is coupled to the HBA entity via a communications path;
    identifying one or more other communications paths that span between the host device and the switch;
    detecting whether a redundancy policy would be violated if the HBA entity were to be turned off, the redundancy policy including at least one rule that specifies a minimum number of active paths that must be present between the host device and the switch at any given time;
    turning off the HBA entity in response to detecting that the redundancy policy would not be violated; and
    leaving the HBA entity turned on in response to detecting that the redundance policy would be violated.

2. The method of claim 1, wherein detecting whether the redundancy policy would be violated includes detecting whether a difference between a count of the other communications paths is greater than or equal to the minimum number of active paths that must be present between the host device and the switch at any given time.

3. The method of claim 1, wherein the HBA entity includes a host bus adapter, and turning off the HBA entity includes turning off the host bus adapter.

4. The method of claim 1, wherein the HBA entity includes a port, and turning off the HBA entity includes turning off a host bus adapter of which the port is part.

5. The method of claim 1, wherein the identifier includes a fibre channel identifier (FCID), and identifying the switch includes retrieving a portion of the FCID that corresponds to the switch.

6. The method of claim 1, wherein the redundancy policy specifies a percentage of all available communications paths between the host device and the switch that must be active at any given time.

7. The method of claim 1, wherein the HBA entity is turned off only when a utilization rate associated with the HBA entity is below a utilization threshold.

8. The method of claim 1, further comprising turning on the HBA entity when a utilization rate associated with the HBA entity rises above a utilization threshold.

9. The method of claim 1, wherein turning off the HBA entity includes powering down the HBA entity.

10. The method of claim 1, further comprising transmitting to the storage array an indication that the HBA entity has been turned off.

11. A system, comprising:
    a memory; and
    at least one processor that is configured to perform the operations of:
    selecting a host bus adapter (HBA) entity that is currently turned on and which is part of a host device, the host device being coupled to a storage array, the host device being configured to read and write data to the storage array;
    identifying an identifier of the HBA entity;
    identifying, based on the identifier, a switch that is coupled to the HBA entity via a communications path;
    identifying one or more other communications paths that span between the host device and the switch;
    detecting whether a redundancy policy would be violated if the HBA entity were to be turned off, the redundancy policy including at least one rule that specifies a minimum number of active paths that must be present between the host device and the switch at any given time;
    turning off the HBA entity in response to detecting that the redundancy policy would not be violated; and
    leaving the HBA entity turned on in response to detecting that the redundancy policy would be violated.

12. The system of claim 11, wherein detecting whether the redundancy policy would be violated includes detecting whether a difference between a count of the other communications paths is greater than or equal to the minimum number of active paths that must be present between the host device and the switch at any given time.

13. The system of claim 11, wherein the HBA entity includes a host bus adapter, and turning off the HBA entity includes turning off the host bus adapter.

14. The system of claim 11, wherein the HBA entity includes a port, and turning off the HBA entity includes turning off a host bus adapter of which the port is part.

15. The system of claim 11, wherein the identifier includes a fibre channel identifier (FCID), and identifying the switch includes retrieving a portion of the FCID that corresponds to the switch.

16. The system of claim 11, wherein the redundancy policy specifies a percentage of all available communications paths between the host device and the switch that must be active at any given time.

17. The system of claim 11, wherein the HBA entity is turned off only when a utilization rate associated with the HBA entity is below a utilization threshold.

18. The system of claim 11, wherein the at least one processor is further configured to perform the operation of turning on the HBA entity when a utilization rate associated with the HBA entity rises above a utilization threshold.

19. The system of claim 11, wherein turning off the HBA entity includes powering down the HBA entity.

20. A non-transitory computer-readable medium storing one or more processor-executable instructions, which, when executed by at least one processor, cause the at least one processor to perform the operations of:
- selecting a host bus adapter (HBA) entity that is currently turned on and which is part of a host device, the host device being coupled to a storage array, the host device being configured to read and write data to the storage array;
- identifying an identifier of the HBA entity;
- identifying, based on the identifier, a switch that is coupled to the HBA entity via a communications path;
- identifying one or more other communications paths that span between the host device and the switch;
- detecting whether a redundancy policy would be violated if the HBA entity were to be turned off, the redundancy policy including at least one rule that specifies a minimum number of active paths that must be present between the host device and the switch at any given time;
- turning off the HBA entity in response to detecting that the redundancy policy would not be violated; and
- leaving the HBA entity turned on in response to detecting that the redundance policy would be violated.

* * * * *